(12) United States Patent
Shah et al.

(10) Patent No.: US 8,937,744 B1
(45) Date of Patent: Jan. 20, 2015

(54) MODIFYING ELECTRONIC DATA LAYOUT FOR EFFICIENT PRINTING OF ELECTRONIC DATA

(75) Inventors: Arpan Shah, Palatine, IL (US); Tom Patterson, Chicago, IL (US); Steven Sheldon, Crystal Lake, IL (US)

(73) Assignee: PrintEco, Inc., Chicago, IL (US)

( * ) Notice: Subject to any disclaimer, the term of this patent is extended or adjusted under 35 U.S.C. 154(b) by 235 days.

(21) Appl. No.: 13/562,146

(22) Filed: Jul. 30, 2012

Related U.S. Application Data

(60) Provisional application No. 61/513,537, filed on Jul. 30, 2011.

(51) Int. Cl.
| | |
|---|---|
| *G06F 15/00* | (2006.01) |
| *G06K 1/00* | (2006.01) |
| *G06K 15/02* | (2006.01) |
| *G06K 15/00* | (2006.01) |
| *G06F 3/12* | (2006.01) |

(52) U.S. Cl.
CPC .................................... *G06F 3/1219* (2013.01)
USPC ............................ 358/1.2; 358/1.11; 358/1.18

(58) Field of Classification Search
None
See application file for complete search history.

(56) References Cited

U.S. PATENT DOCUMENTS

| | | | |
|---|---|---|---|
| 5,995,238 A | 11/1999 | Yu | |
| 7,617,446 B2 | 11/2009 | Dutta | |
| 2002/0071689 A1 | 6/2002 | Miyamoto | |
| 2003/0113130 A1 | 6/2003 | Robertson | |
| 2009/0190158 A1 | 7/2009 | Sundararajan | |
| 2010/0146378 A1* | 6/2010 | Bank et al. | 715/234 |
| 2010/0231960 A1 | 9/2010 | Kurata et al. | |
| 2011/0043831 A1 | 2/2011 | Sprague et al. | |
| 2011/0307238 A1* | 12/2011 | Scoda | 703/26 |
| 2012/0092683 A1* | 4/2012 | Ouchi | 358/1.2 |
| 2012/0188608 A1* | 7/2012 | Nakatsuka | 358/1.18 |
| 2013/0128314 A1* | 5/2013 | Chopra et al. | 358/1.18 |

* cited by examiner

*Primary Examiner* — Fan Zhang
(74) *Attorney, Agent, or Firm* — Cherskov Flaynik & Gurda

(57) ABSTRACT

A system and a method are disclosed for modifying a layout associated with data to reduce the amount of paper used when generating a paper copy of the data. Responsive to receiving an input to modify a layout associated with data presented on a computing device for printing, the layout is modified. In one embodiment, a type associated with the data is determined, and a modified layout is generated based on the type. For example, the layout is differently modified if the data is an electronic document, a spreadsheet, a Web page or another type of data. In one embodiment, the modified layout is displayed on a display and the data and the modified layout are transmitted to a printer responsive to an input confirming the modified layout.

15 Claims, 13 Drawing Sheets

MODIFYING ELECTRONIC DATA LAYOUT FOR EFFICIENT PRINTING OF ELECTRONIC DATA

CROSS REFERENCE TO RELATED APPLICATIONS

This application claims priority benefit as a utility of U.S. Provisional Application No. 61/513,573 filed on Jul. 30, 2011, which is incorporated herein by reference.

FIELD OF ART

The present invention generally relates to the field of document printing, and more specifically, to modifying data layout to reduce the amount of paper used when printing a document.

DESCRIPTION OF THE RELATED ART

Frequently, users view data on a computing device and print a paper representation of the viewed data. This allows the users to more easily review and edit the viewed data using the paper representation or to more easily transport the paper representation of the viewed data. However, printing a paper representation of viewed data (also referred to as a "document") consumes additional resources. For example, costs are incurred in obtaining the paper used for the documents and subsequently disposing of the printed documents. Additionally, the printer used to print a document consumes power while printing, and the acquisition and use of ink cartridges introduces additional costs. Further, printing documents causes emission of greenhouse gases, so printing of large documents by various entities creates a negative environmental impact.

In many cases, a portion of a printed document is also wasteful due to the formatting of the viewed data. For example, a printed document may include mostly blank pages or may include advertisements of little interest to a user. Additionally, certain data formats suited for viewing on a computing device are poorly suited for generating documents. For example, formatting of a spreadsheet may enhance its presentation on a computing device, but significantly increase the number of pages needed to generate a paper copy of the spreadsheet. As another example, printing an email thread frequently prints a complete email thread rather than the email messages of interest. Recent studies have indicated that an average of 17% of printing in enterprise environments is devoted to printing pages a user does not need.

SUMMARY

An object of the invention is to optimize the amount of consumables spent on generating printed versions of electronic information through optimization of electronic information prior to printing the content An additional object of the invention is to remove low-value content from printouts. A feature of the invention is that, in one embodiment, the process assigns a value to information being presented and removes low-value content. An advantage of the system is that it assists end users in selecting unnecessary content.

Another object of the invention is to decrease the number of pages in a printout by optimizing formatting choices made by the user. In one embodiment, a feature of the invention is that the process includes changing document formatting user choices to cut down on the number of pages generated. An advantage of the system is that it can eliminate unnecessary pages while preserving overall document fidelity.

A further object of the invention is to optimize printing while maintaining the same workflow for end users. A feature of one embodiment of the invention is that the printing optimization is invoked from within the same application as when printing is performed without optimization. An advantage of the invention is that the end users do not have to learn new optimization software and can invoke features seamlessly within familiar applications.

A yet further objective of the invention is to provide a preview of the optimized version of the printed document within the client application being used to generate the content. In one embodiment, the system comprises a plug-in software module which adds printing optimization features that are tightly coupled with the content application hosting the plug-in software. An advantage of the invention is that the printing optimization is seamlessly integrated with the client application.

Another object of the invention is to interact with user-generated content in its native format. A feature of the system, in one embodiment, is that the printing optimization software communicates directly with the content-generating application and obtains the user-input directly from the application. An advantage of the invention is that the printing optimization process does not require conversion and re-detection of the content type during the optimization process.

One embodiment of a disclosed system (and method) modifies a layout associated with data to reduce the amount of paper used when generating a paper copy of the data. Responsive to receiving an input to modify a layout associated with data presented on a computing device for printing, the layout is modified. In one embodiment, a type associated with the data is determined, and a modified layout is generated based on the type. For example, if the data is an electronic document, one or more margins are modified to one or more predefined values, trailing whitespace is removed and font size is modified to minimize the number of physical pages used to print the data. As another example, if the data is a spreadsheet, one or more margins are modified to one or more predefined values, font size is reduced to a predetermined size, a page width is set to a specified value and the orientation of the spreadsheet is modified to reduce the number of physical pages used to print the data. In yet another example, if the data is a Web page, elements of the Web page are analyzed to identify the core content, elements of the Web page having specified attributes are removed and a background color associated with the Web page is set to a specified value. In one embodiment, the modified layout is displayed on a display device. Responsive to receiving an input confirming the modified layout, the data and the modified layout are transmitted to a printer, which generates a paper representation of the data according to the modified layout. In an embodiment, responsive to receiving an input rejecting the modified layout, the original layout associated with the data is restored.

The features and advantages described in the specification are not all inclusive and, in particular, many additional features and advantages will be apparent to one of ordinary skill in the art in view of the drawings, specification and any claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description and any appended claims, when taken in conjunction with the accompanying drawings, in which:

DETAILED DESCRIPTION

The Figures (FIGS.) and the following description relate to preferred embodiments of the present invention by way of illustration only. It should be noted that from the following discussion, alternative embodiments of the structures and methods disclosed herein will be readily recognized as viable alternatives that may be employed without departing from the described principles.

Reference will now be made in detail to several embodiments, examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles described herein.

Architectural Overview

Figure 1:
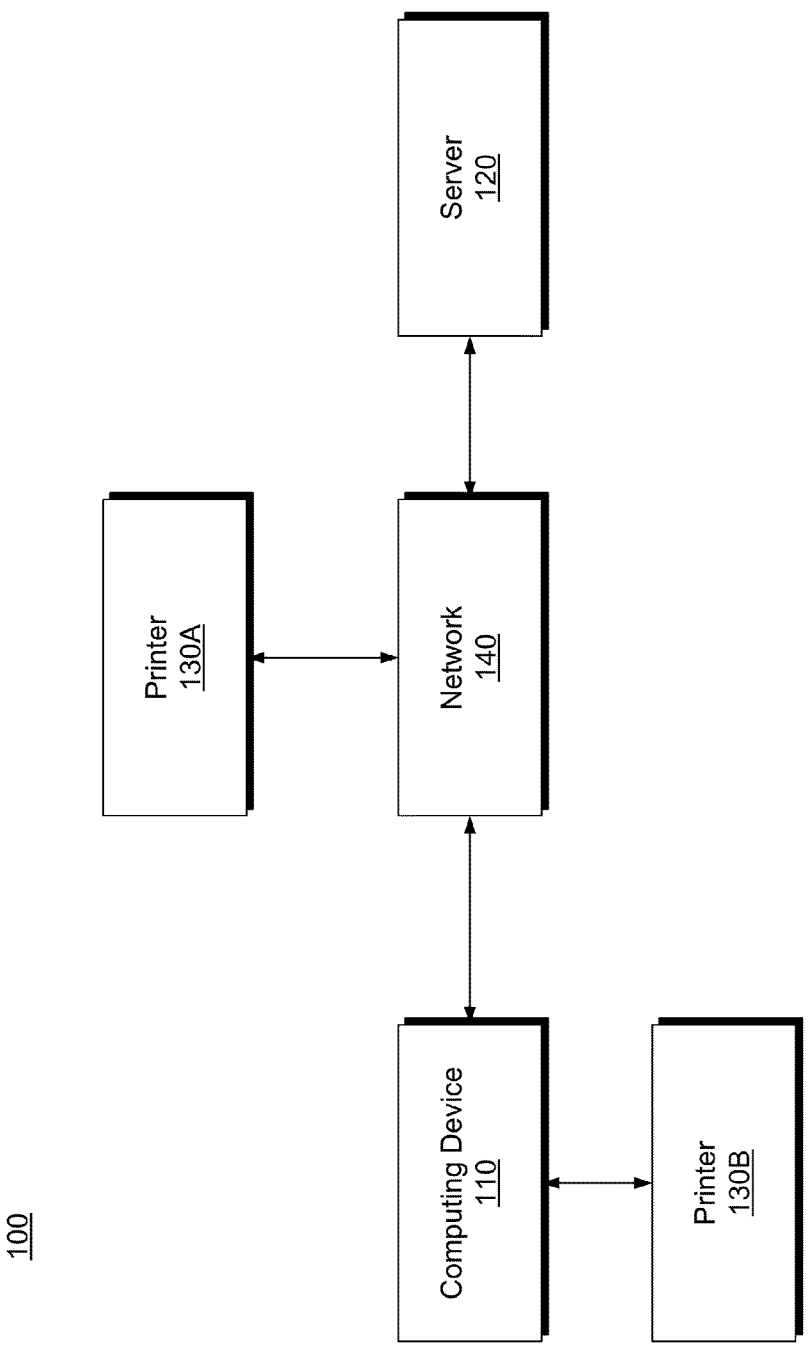
FIG. 1 illustrates one embodiment of a computing environment.

FIG. 1 is a block diagram of one embodiment of a computing environment 100. The example computing environment 100 shown by FIG. 1 includes a computing device 110, a server 120 and one or more printers 130A, 130B (also referred to herein individually and collectively using reference number 130). The computing device 110, the server 120 and a printer 130A are coupled to a network 140 in the example shown by FIG. 1. Additionally, for purposes of illustration FIG. 1 also illustrates a printer 130B coupled to the computing device 110. In different embodiments, the computing environment 100 may include different and/or additional components than those shown by FIG. 1.

The computing device 110 is any device with data processing and data communication capabilities. Examples of a computing device 110 include a smartphone, a tablet computer, a netbook computer, a laptop computer, a desktop computer or any other suitable device known to one skilled in the art. In one embodiment, the computing device 110 exchanges data with the server 120 via the network 140. The computing device 110 communicates data with a printer 130 via the network 140 or via a direct communication channel. A printer 130 generates a physical representation of the data received from the computing device 110. Further, the computing device 110 includes instructions that, when executed, enable user interaction with data stored by the computing device 110 or accessible via the network 140 from a server 120, another computing device or another suitable component. The computing device 110 is further described below in conjunction with FIG. 2.

The server 120 is coupled to the network 140 and exchanges data with the computing device 110 via the network 140. The server 120 is one or more computing devices having data processing and data communication capabilities. For example, the server 120 provides data such as a Web page, audio content, video content, application data or other data to the computing device 110 via the network 140. In one embodiment, the server 120 also receives data from the computing device 110 and/or a printer 130 via the network 140. For example, the server 120 receives from the computing device 110 data describing the number of pages printed from the computing device 110, data describing the financial cost associated with the number of pages printed from the computing device 110 and/or data describing the carbon dioxide cost associated with the number of pages printed from the computing device 110. In one embodiment, the server 120 pushes data to the computing device 110 via the network 140.

A printer 130 is a device that receives electronic data and a layout associated with the electronic data and generates a paper representation of the electronic data. For example, the printer 130 applies ink to paper or another substrate as specified by the layout to replicate the electronic data on the paper or other substrate. For example, the layout identifies margins where the electronic data stops, a size associated with portions of the electronic data or other information describing the presentation of the electronic data. FIG. 1 illustrates a printer 130A coupled to the network 140 and receiving data from the computing device 110 via the network 140 as well as a printer 130B directly coupled to the computing device 110 and receiving data directly from the computing device 110. In another embodiment, a single printer 130 is directly or indirectly coupled to the computing device 110. In additional embodiments, a greater number of printers 130 may be coupled to the computing device 110.

The network 140 is a conventional type for data transmission. In various embodiments the network 140 is a wired network, a wireless network or a combination of wireless and wired networks. The network 140 may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 140 may be a peer-to-peer network. The network 140 may also be coupled to or include portions of a telecommunications network for sending data in a variety of different communication protocols, such as Transport Control Protocol/Internet Protocol (TCP/IP). For example, the network 140 may transmit data using one or more of a Global System for Mobile (GSM) communication system, Code Division Multiple Access (CDMA) system, Universal Mobile Telecommunications System (UMTS), General Packet Radio Service (GPRS), third-generation (3G), or greater, networks, fourth-generation (4G), or greater, networks, High Speed Download Packet Access (HSDPA), Long-Term Evolution (LTE), Worldwide Interoperability for Microwave Access (WiMax), an IEEE 802.11 compliant network, an Ethernet network or any other suitable communication system. In another embodiment, the network 140 includes BLUETOOTH™ communication networks or a cellular communications network for sending and receiving data. In one or more embodiments, the network 140 communicates data such as short messaging service (SMS) messages, multimedia messaging service (MMS) messages, hypertext transfer protocol (HTTP) data, direct data connection messages, wireless application protocol (WAP) data or other types of data known to one skilled in the art.

Figure 2:
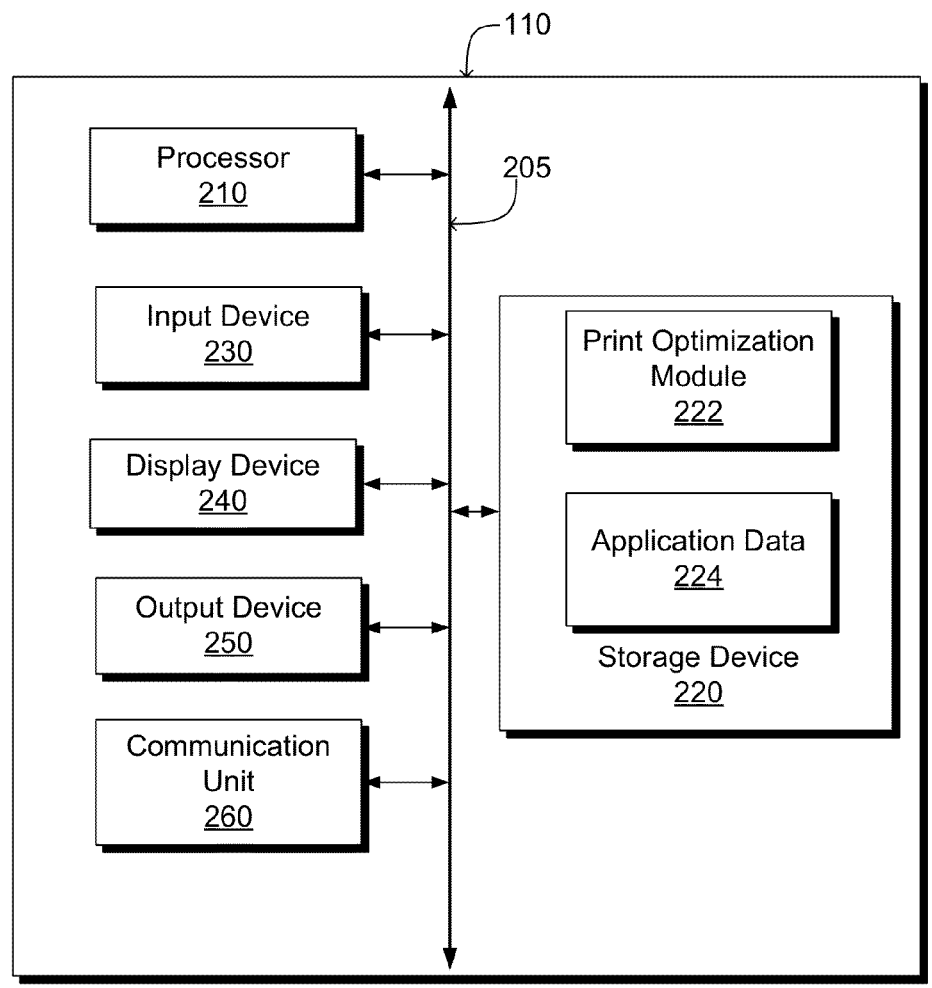
FIG. 2 illustrates one embodiment of a computing device.

FIG. 2 is a block diagram of one embodiment of a computing device 110. In the embodiment shown by FIG. 2, the computing device 110 includes a processor 210, a storage device 220, an input device 230, a display device 240, an output device 250 and a communication unit 260 coupled together via a data bus 205. However, in other embodiments the computing device 110 includes different and/or additional components than those illustrated by FIG. 2.

The processor 210 processes data or instructions and may comprise various computing architectures. For example, the processor 210 may process data or instructions using a complex instruction set computer (CISC) architecture, a reduced instruction set computer (RISC) architecture, an architecture implementing a combination of instructions sets or any other suitable instruction set. Although FIG. 2 shows a single processor 210, in other embodiments the computing device 110 may include multiple processors. The processor 210 transmits, processes and/or retrieves data from the storage device 220, the input device 230, the display device 240, the output device 250 and/or the communication unit 260 via the data bus 205. While depicted as separate devices, in one embodiment, some of these devices may be combined, for example the display device 240 incorporates an input device 230, such as a touchscreen interface or other digitizer. In another embodiment, using a "system on a chip" design, the data bus 205 between several of the devices is minimized or altogether eliminated.

The storage device 220 stores data and/or instructions that, when executed by the processor 210, cause the processor 210 to perform one or more actions or to provide one or more types of functionality. The data and/or instructions stored by, or encoded on, the storage device 220 may comprise computer-readable code that, when executed by the processor 210, performs one or more of the methods further described herein and/or provides at least a subset of the functionality described herein. The storage device 220 may comprise a dynamic random access memory (DRAM), a stating random access memory (SRAM), a hard disk, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM), a Flash memory or another memory device known in the art.

The storage device 220 may be a persistent storage device, a non-persistent storage device or a combination of a persistent storage device and a non-persistent storage device in various embodiments. The storage device 220 is coupled to the processor 210, the input device 230, the display device 240, the output device 250 and the communication unit 260 via the bus 250. In the embodiment shown by FIG. 2, the storage device 220 includes a print optimization module 222 and application data 224.

The print optimization module 222 comprises instructions that, when executed by the processor 210, manages generation of a display of a WYSIWYG representation (commonly referred-to as a print preview) of data identified by the computing device 110. In one embodiment, the print optimization module 222 modifies a layout associated with identified data to reduce the number of pages used to generate a printed representation of the data (also referred to herein as a "document"). As used herein, layout is information that is associated with data specifying visual presentation of the data. For example, the layout identifies an orientation associated with the data, margins associated with the data, font size associated with the data and the amount of data included on a physical page. The print optimization module 220 generates a modified layout based on a data type. In one embodiment, the modified layout reduces the number of pages used to generate a document corresponding to the data. For example, the modified layout reduces the font size associated with the data, reduces the margins associated with the data and/or modifies the orientation of the data to reduce the number of physical pages needed to produce a document. Operation of the print optimization module 222 is further described below in conjunction with FIGS. 3-5.

The application data 224 comprises instructions that, when executed by the processor 210, implement one or more applications providing functionality to a user of the computing device 110 or to the computing device 110. In one embodiment, the application data 224 includes instructions for implementing one or more of a Web browser, an email client, a word processor and/or a spreadsheet editor. However, in other embodiments, the application data 224 may include instructions for implementing different and/or additional functionality. For example, execution of the application data 224 allows a user to view and edit text data stored by the storage device 220 and communicate the text data to a printer 130 to generate a document. Additionally, in one embodiment, the print optimization module 222 is included in the application data 224, so that the print optimization module 222 is accessible from within an executing application. For example, in one embodiment, the print optimization module 222 is a plug-in associated with one or more applications.

The input device 230 is any device configured to receive input and communicate the received input to the processor 210, to the storage device 220, to the display device 240 and/or to another component of the computing device 110 using the bus 205. For example the input device 230 comprises one or more of a cursor controller, a touch-sensitive display or a keyboard. In one embodiment, the input device 230 includes an alphanumeric input device, such as a keyboard, a key pad, representations of such created on a touch-sensitive display or another device adapted to communicate information and/or commands to the processor 210 and/or to one or more additional components of the computing device 110. In another embodiment, the input device 230 comprises an input device for communication positional data as well as commands to the processor 210 or to another component of the computing device 110 such as a joystick, a mouse, a trackball, a stylus, a touch-sensitive display, directional keys or another suitable input device known in the art.

The display device 240 is a device displaying electronic images and/or data. For example, the display device 240 comprises an organic light emitting diode (OLED), a liquid crystal display (LCD) or any other device known to one skilled in the art. In one embodiment, the display device 240 includes a touch-sensitive transparent panel for receiving data or for allowing other interaction with the data and/or images displayed by the display device 240.

The output device 250 comprises one or more devices that convey information to a user of the computing device 110. For example, the output device 250 includes one or more speakers or headphones for presenting audio data to a user. As another example, the output device 250 includes one or more light emitting diodes (LEDs), or other light sources, to provide visual data to a user. For another example, the output device 250 includes one or more devices for providing haptic, or vibrational, feedback. However, the above are merely examples and the output device 250 may include one or more devices for providing auditory output, visual output, tactile output, any combination of the previously-identified outputs or any other suitable type of output.

The communication unit 260 transmits data from the computing device 110 to the network 140, to a printer 130 or to another computing device 110. The communication unit 260 also receives data from the network 140, from a printer 130 or from another computing device 110. In one embodiment, the communication unit 260 comprises a wireless transceiver that transmits and/or receives data using one or more wireless communication protocols. For example, the communication unit 260 includes one or more wireless transceivers transmitting and/or receiving data using one or more wireless communication protocols. Examples of wireless communication protocols include IEEE 802.11a/b/g/n (WiFi), Global System for Mobile (GSM), Code Division Multiple Access (CDMA), Universal Mobile Telecommunications System (UMTS), General Packet Radio Service (GPRS), third-generation (3G), or greater, networks, fourth-generation (4G), or greater, networks, High Speed Download Packet Access (HSDPA), Long-Term Evolution (LTE), Worldwide Interoperability for Microwave Access (WiMax), BLUETOOTH™ or any other suitable wireless communication protocol.

In another embodiment, the communication unit 260 comprises a network adapter or another type of wired communication port for communicating with the network 140, with a printer 130 and/or with another computing device 110 using a wired communication protocol. Examples of wired communication protocols include Universal Serial Bus (USB), Ethernet or another suitable wired communication protocol. In yet another embodiment, the communication unit 260 comprises a combination of one or more transceivers and a wired communication port.

Methods of Operation

In one embodiment, the print optimization module 222 comprises different plug-ins for different types of applications. In one embodiment, the print optimization module 222 comprises code which is shared between different plug-ins, with a baseline of functionality shared between all plugins. Therefore, while in one embodiment, the system employs multiple separate plug-ins, these are a type of interface to the general module 222. In another embodiment, different and entirely separate plug-ins are used to perform the functions of the print optimization module 222.

Printing Optimization Overview

Figure 3:
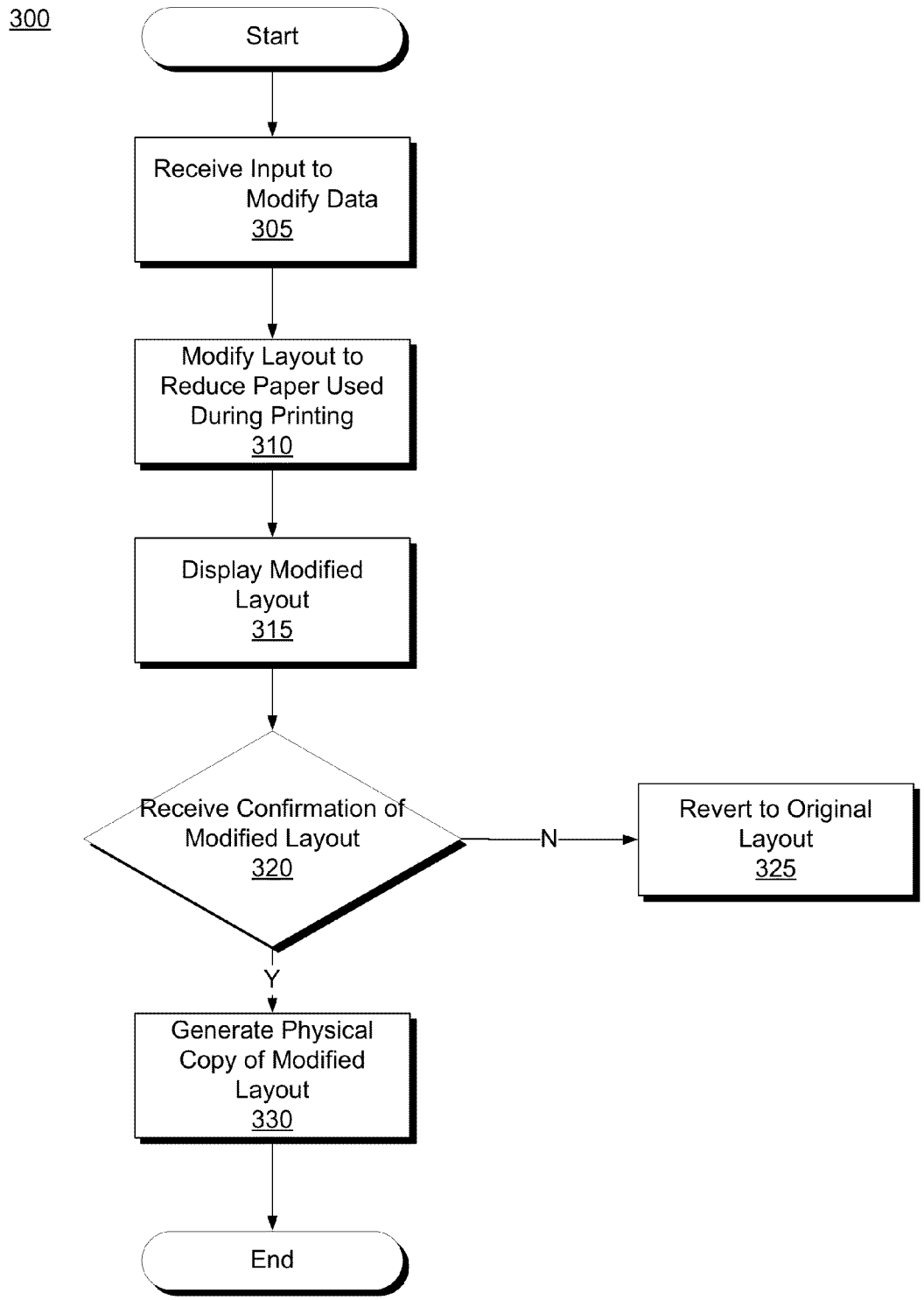
FIG. 3 illustrates one embodiment of a method for reducing paper consumption when printing a document.

FIG. 3 illustrates one embodiment of a system and method 300 for reducing paper consumption when printing a document. In one embodiment, the system comprises a plug-in for a word processor application, such as Microsoft® Word, running on a computing device 110.

Initially, the print optimization module 222 receives 305 input to modify the original layout as identified by the computing device 110. In one embodiment, the print optimization module 222 is a plug-in associated with an application executed when a subset of the application data 224 is executed by the processor 210. In this embodiment, the print optimization module 220 received 305 input via a menu and/or icon displayed by the executed application. For example, an element associated of a menu displayed by the executing application is associated with the print optimization module 222 and the element of the menu receives 305 an input identifying data to be printed.

Figure 3B:
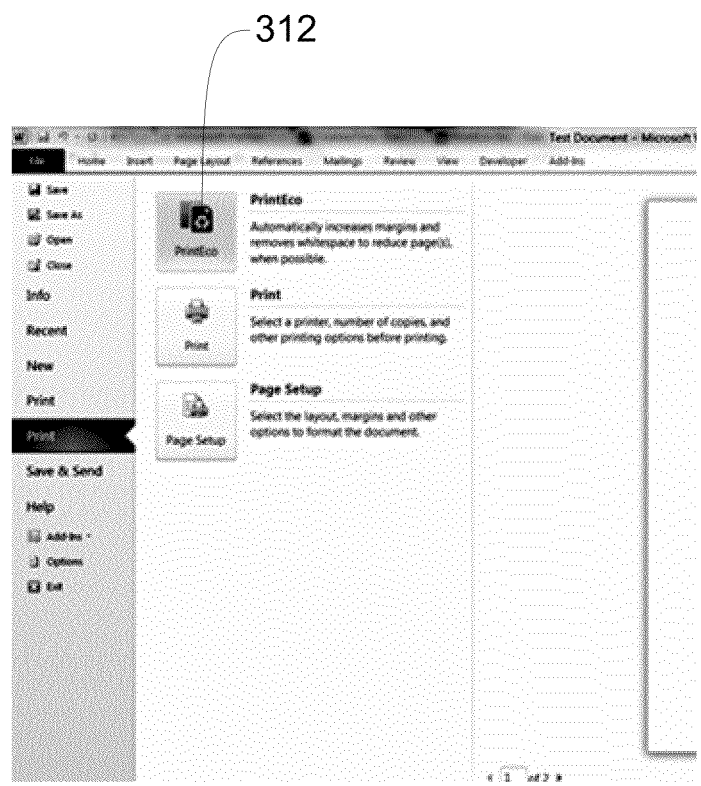
FIG. 3B-3D illustrate one embodiment of an implementation of a method for reducing paper consumption.

In the embodiment shown in FIG. 3B, print optimization module 222 receives 305 the input to modify the data by invoking the application print option. In another embodiment, the input 305 comprises a separate indication from the user, such as a dedicated menu option or button within the content-generating application. In one embodiment, the print optimization module 222 is an application plug in, the print optimization module 222 is invoked either expressly by the user by clicking on an appropriate print optimization icon, and/or also when the user invokes the standard application print option, by for instance, pressing the CTRL+P key combination or clicking on the standard print icon on the toolbar. The embodiment shown in FIG. 3B begins the modification 305 step of the print optimization module 222 as soon as the user invokes the print function. The layout modification step 310 is run once the user clicks the print optimization module 222 option, such as the command button 312 shown in FIG. 3B. By allowing the print optimization module 222 modification step 310 to be invoked within the content-generation application, the print optimization module becomes tightly integrated with the content-generating application. The embodiment shown in FIG. 3B uses the application programming interface to display the command button 312 and also to operate the layout modification step 310. The approach used in the embodiment shown in FIG. 3B offers several benefits. Mainly, it allows for modification of any type of word processing file (including the content-generation application's native format, as well as text, rtf, and various other proprietary formats), so long as the word processing file can be opened by the content-generation application. Further, the print optimization module 222 does not require the file format to be exported first, and it does not detect the type of electronic information being printed inasmuch as it is a word processor plug-in it already is aware of that the information type is document content. Therefore, the plug-in can obviate the need for any detection steps, which can mistake information types and result in suboptimal results (such as by applying spreadsheet optimizations to text files). The use of the command button 312 within the print confirmation dialog also does not interrupt the usual user interface path for printing—the user does not need to export the file first, nor does the user have to save the file prior to the layout modification step 310. By running within the content generating application programming interface, the print optimization module 222 appears as another feature, as opposed to an outside program for the end user to learn and accept.

After receiving 305 the input to begin modification, the print optimization module 222 modifies 310 a layout associated with the identified data. In one embodiment, the print optimization module 222 modifies 310 a font size associated with the data, one or more margins associated with the data, an orientation of the data, spacing associated with at least a subset of the data or any other suitable attribute of the layout associated with the data. In some embodiments, the print optimization module 222 also removes a subset of the data when modifying 310 the layout. For example, the print optimization module 222 identifies and removes advertisements from the data, identifies and removes trailing whitespace from the data, identifies and removes data from older emails from the data or removes other portions of the data. The specific optimization steps for different types of electronic information will be addressed supra.

In one embodiment, where the print optimization module does not comprise multiple plugins, the print optimization module 222 first determines a type associated with the data then modifies 310 the layout associated with the data based in part on the determined type. For example, the print optimization module 222 modifies 310 a layout associated with an electronic spreadsheet as further described below in conjunction with FIG. 4 and modifies 310 a layout associated with an electronic document as further described below in conjunction with FIG. 5. The print optimization module 222 may differently modify 310 the layout associated with data for a wide variety of data types. In one embodiment, the print optimization module 222 determines a type associated with the data based on an extension of a file including the data, an attribute of the data, a received user input or any other suitable information. In a different embodiment where the print optimization module 222 is a plug-in or a set of plug-ins associated with content-generating applications, the application is used to determine the type associated with the data. For example, if the print optimization module 222 is a plug-in associated with a word processor, the print optimization module 222 determines that the data is an electronic document. As another example, if the print optimization module 222 is a plug-in associated with a Web browser, the print optimization module 222 determines that the data is a Web page.

In one embodiment, the modified data layout is then displayed 315 by the print optimization module 222 using the display device 240. For example, one or more images depicting the data presented in the modified format are displayed 315. By displaying images representing the modified layout, the print optimization module 222 allows a user to view the data in the modified layout prior to printing. This allows the user to verify that the presentation of the data in the modified format is suitable for the user's needs or requirement. For example, the modified format may not be suitable for printing an electronic document that is to be signed to form a legal agreement due to the modifications in the layout. Displaying 315 the electronic document in the modified layout allows a user to identify any problems with use of the modified format before paper, or another material, is used to print the electronic document in the modified layout.

Figure 3C:
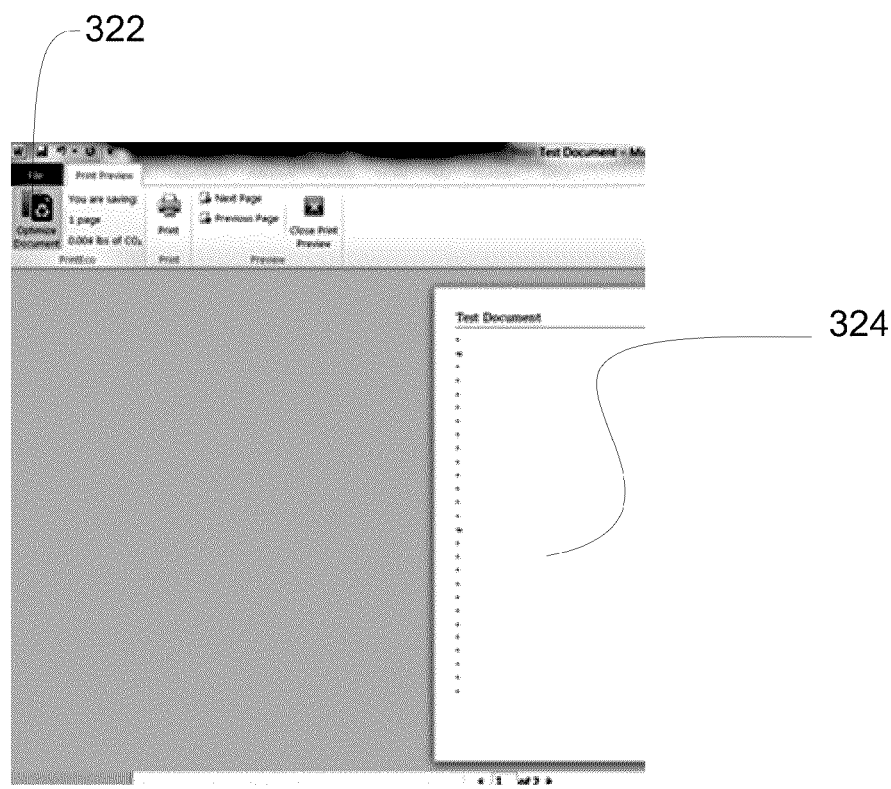

As shown in FIG. 3C, in one embodiment, the display of the modified layout step 315 occurs using the content-generating application's own print preview window. In the embodiment wherein the print optimization module 222 is a plug-in, such close integration with the content-generating application is used to provide the user a seamless preview of the layout modification 315 step. In the embodiment shown in FIG. 3C, the content-generating application's own print preview window includes a printing optimization module 222 status indicator 322 (such as a toggle button) which indicates to the user whether or not the content-generating application preview section 324 is displaying 315 the results of the modification 310 or the original layout.

The print optimization module 222 then determines 320 if confirmation of the modified layout is received. For example, the print optimization module 222 receives an input confirming that a user accepts the modified layout. Responsive to determining 320 that the modified layout is confirmed, the print optimization module 222, or an application, generates 330 a physical copy of the data using the modified layout. For example, the print optimization module 222 transmits the data and a description of the modified layout to a printer 130, which generates a paper representation of the data where the data is formatted as specified by the modified layout. However, responsive to determining 320 that the modified layout is not confirmed, the print optimization module 222 reverts 325 the data to its original format. For example, if the print optimization module 222 receives an input rejecting the modified layout, the original format is used to display the electronic data.

Figure 3D:
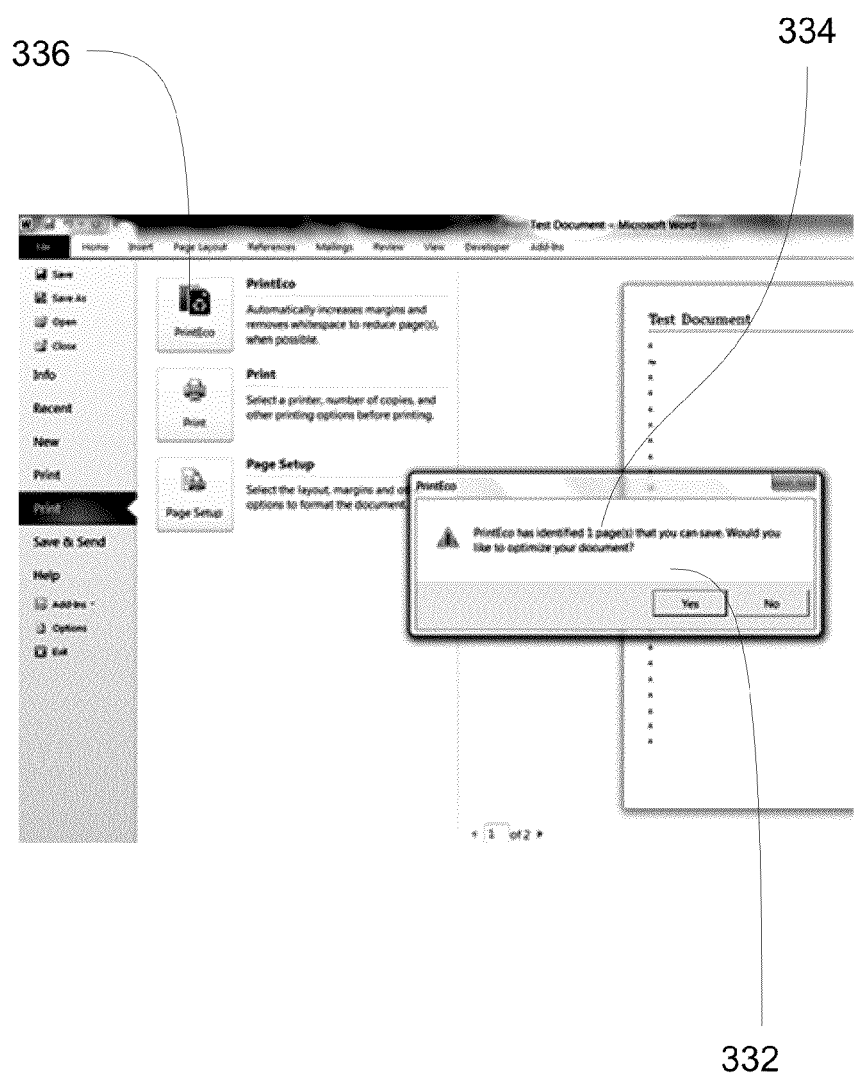

In one embodiment, the begin modification step 305 is run automatically and in the background once the print optimization module 222 detects that a user has selected the print option within a content-generating application. As shown in FIG. 3D, the print optimization module 222 modifies the layout 310 and then reminds the user 332 whether or not the user would prefer a modified layout 315 rather than the original layout. In the embodiment shown in FIG. 3D, the modified layout 315 is not shown to the user unless the user accepts the reminder. While in FIG. 3D, the reminder appears as a dialog box, in other embodiments, the reminder appears as a system notification, a sound, animation, and other form of user feedback, such as a highlighting of the print optimization module 222 button 336. Further, in the embodiment shown in FIG. 3D, as part of the reminding step 332, the print optimization module 222 is able to provide to the user an indication 334 of how many pages would be saved if the modified layout 315 is used. The reminder functions to encourage end users to use the printing optimization module 222. While in the embodiment shown in FIG. 3D the number of saved pages is shown, in other embodiments, the reminder 332 also includes other environmental impact information, such as the amount of carbon dioxide saved from invoking the optimization. In yet another embodiment, the reminder indicates to the user other information such as how much has been saved by invoking the optimization in the past, how much printing time will be saved by using the optimization. The information regarding peer use of the optimization module 222 is shared over the network 140 in one embodiment and in this embodiment; the reminder 332 includes an indication whether the user's peers have been using the print optimization.

In one embodiment, prior to generating the modified layout 310, the module 222 determines the number of pages that would be required to print the original layout. Following the modification of the original layout 310, the module 222 calculates the number of pages in the modified layout 310. If the difference in the number of pages in the original layout versus the modified layout exceeds a certain threshold, the modified layout is considered too aggressive and is not displayed to the user in step 315. Instead, the original layout is displayed, instead with an indication that the modified layout may be suboptimal. In another embodiment, the modified layout is rejected if the percentage difference in the number of pages in the modified layout exceeds a threshold value, such as 50%. The percentage difference is calculated according to the following formula:

$$percent_{difference} = \frac{(\#pages_{original} - \#pages_{modified})}{\#pages_{original}} \times 100 \quad \text{(Eq. 1)}$$

In Equation 1, $percent_{difference}$ is the percentage of the pages saved in the modified layout, $\#pages_{original}$ is the number of pages in the original layout and $\#pages_{modified}$ is the number of pages in the modified layout generated by modification step 310.

In one embodiment, the user then has the choice to view the suboptimal modified layout. In another embodiment, the print optimization module 222 simply notifies the user that the modified layout could not be generated.

In one embodiment, whether the percentage$_{difference}$ value is acceptable or not depends on the type of data contained in the original layout. For example, if the original layout contains mostly text, a larger page$_{difference}$ is acceptable. If the original layout primarily comprises graphics and numbers, an acceptable page$_{difference}$ is set to a lower number (i.e. 33% rather than 50%). In another embodiment, the acceptable page$_{difference}$ is set by the intended medium of reproduction of the original layout. For example, if the original layout contains formatting choices optimized for high-resolution screens (such as text having sizes of 14 or 18 points), this font size will be reduced resulting in an abnormally high page$_{difference}$ value. However, taking account of the intent of the original layout, the high page$_{difference}$ value is acceptable, in this embodiment.

Spreadsheet Optimization

Figure 4:
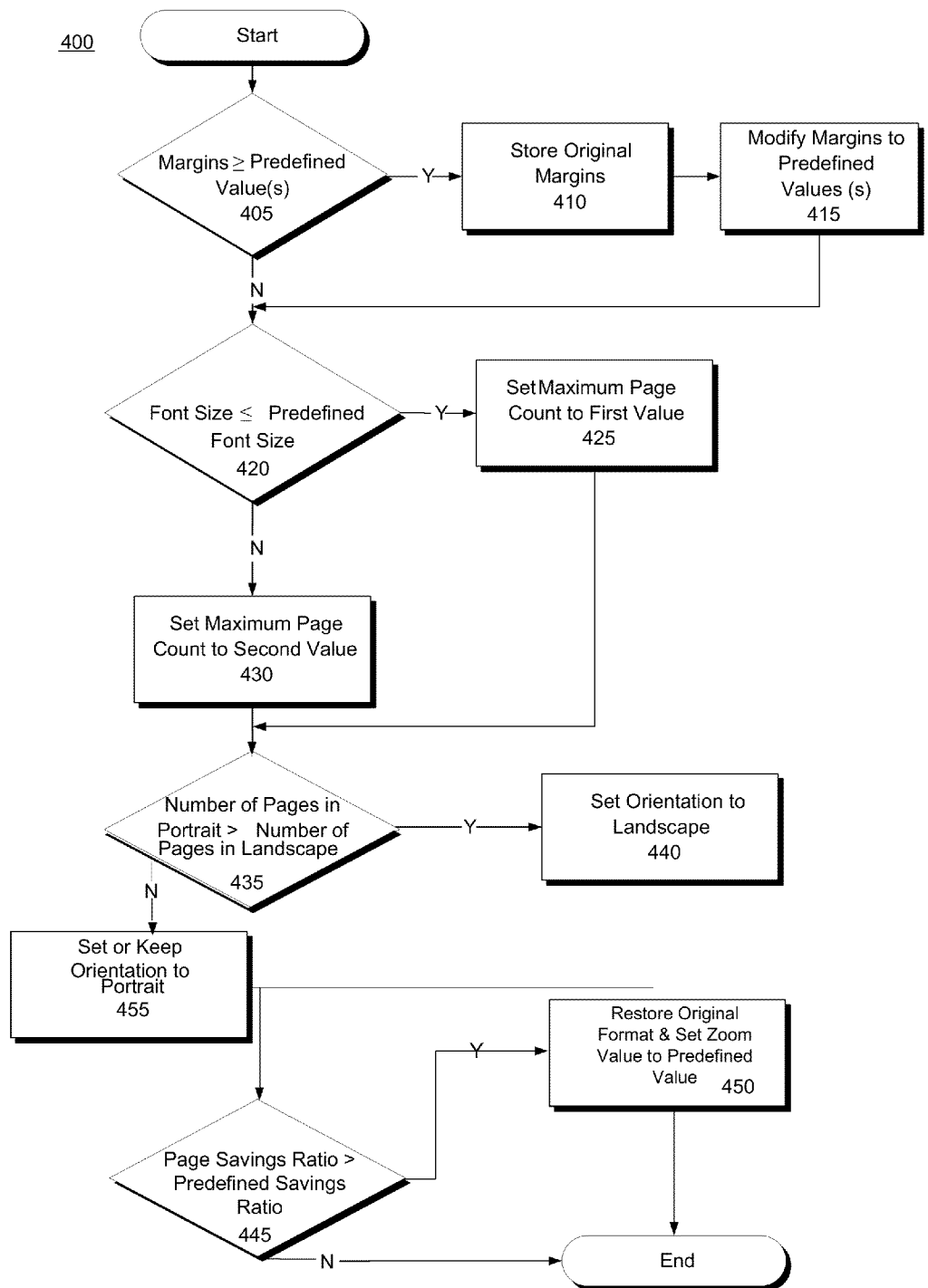
FIG. 4 illustrates one embodiment of a method for modifying a data layout to reduce the number of pages used when printing the data.

FIG. 4 illustrates one embodiment of a system and method 400 for modifying a data layout to reduce the number of pages used when printing the data. The embodiment shown by FIG. 4 illustrates modification of data having a spreadsheet type; thus the print optimization module 222 modifies data using the method described in FIG. 4, when the print optimization module 222 is executed or invoked from a content-generation application for spreadsheets, such as Excel® spreadsheet software, in one embodiment.

The print optimization module 222 determines 405 whether the margins specified by the original layout equal or exceed a predefined value, or predefined values wherein different predefined values exist for different margins (such as left margin, right margin, top and bottom margins). Responsive to determining that a margin is greater than the corresponding predefined value, the print optimization module 222 stores 410 the original margins specified by the original layout and modifies 415 the margins that are not less than the predefined value to equal the predefined value. In one embodiment, the determination 405 compares each margin to a single predefined value. Alternatively, different margins may be compared to different predetermined values. In one embodiment, the print optimization module 222 determines 405 whether the original layout's top margin and a bottom margin equal or exceed a first predefined value and determines 405 whether the original layout's left margin and a right margin equal or exceed a second threshold value. For example, the print optimization module 222 determines 405 whether a top margin and a bottom margin are greater than 0.75 inches and determines 405 whether a left margin and a right margin are greater than 0.25 inches. Responsive to determining 405 that a margin is greater than or equal to a threshold value, the margin that is greater than or equal to the threshold value is stored 410 and modified 415 to equal the threshold value. As the margins affect the amount of paper that does not included printed data, reducing the margins based on the determination 405 increases the amount of paper including printed data.

In one embodiment, the print optimization module 222 uses different threshold values in step 405 on the basis of the data found in the spreadsheet. For example, one set of margins is used for data which is primarily numerical in nature, and a different set of margins is used for textual data. Further, a different set of margins is used, in one embodiment, if the spreadsheet includes graphs to be printed.

Following the determining 405 that a margin does not equal or exceed the predefined value, or predefined values or after modifying 420 one or more margins to not exceed the predefined value or predefined values, the print optimization module 222 determines 425 whether the font size specified by the original layout is less than or equal to a predefined font size. The predefined font size is calculated as a minimum threshold of readability for a given printer or type of printer, in one embodiment. For instance, many laser printers can render legible fonts as small as 6 points. Other printers, such as inkjet printers become difficult to read as the font size decreased below 8 points. In one embodiment, the type of data (i.e. number centric versus text centric) also determines the predefined font size used in step 420.

In one embodiment, the print optimization module 222 determines 425 whether the original layout specifies a font size that is less than or equal to a minimum value, such as an 8 point font. Responsive to determining 425 that the font size associated with the original layout is less than or equal to the predefined font size, the print optimization module 222 sets 430 a maximum page count to a first value.

In one embodiment, determining 425 the original layout specifies a font size of 8 point or less, the print optimization module 222 sets 430 a maximum page count to a fixed number of pages, such as three pages. The maximum page count specifies the number of pages used to reproduce data from the columns of the spreadsheet. For example, setting 430 the maximum page count to three pages causes the font size to be scaled in the spreadsheet so that all of the columns of the spreadsheet are included in three sheets of paper. However, responsive to determining 425 the font size included in the original layout exceeds the predefined font size, the print optimization module 222 sets 430 the maximum page count to a second value. In one embodiment, upon determining 425 the original layout specifies a font size greater than 8 point, the print optimization module 222 sets 430 a maximum page count of one page; thus, if the original font size is greater than 8 point, the total columns of the spreadsheet are scaled to fit within the width of a single page. While in one embodiment, the page count values are set to a constant, (such as three for font sizes of 8 points or less and one for font sizes of greater than 8 points), other methods of determining the page counts are used in additional embodiments. In one embodiment, the print optimization module 222 determines the page count on the basis of the average font size in all the cells. In another embodiment, the print optimization module 222 determines the page count number on the basis of font sizes of only some of the spreadsheet cells, such as those cells containing text while ignoring cells containing numerical values.

After determining the target number of pages, the print optimization module 222 determines 435 whether a number of pages used in printing a physical copy of the data in a portrait orientation exceeds a number of pages used in printing a physical copy of the data in a landscape orientation. Responsive to determining 435 that the landscape orientation of the data results in a fewer number of pages, the print optimization module 222 sets 440 the orientation of the data to the landscape orientation. However, responsive to determining 435 that the portrait orientation of the data results in a fewer number of pages, the print optimization module 222 sets or keeps 455 the orientation of the data to the portrait orientation. Hence, the print optimization 222 module determines the data orientation resulting in the fewest number of pages for use in generating a physical copy of the data.

In one embodiment, after specifying the maximum page count and after verifying that the number of pages saved in the two orientations, the print optimization module 222 determines 445 whether the page savings ratio, defined in Eq. 1 above is greater than a predefined savings ratio. If so, in one embodiment, the print optimization module 222 restores 450 the original format and then uses the spreadsheet zoom value to a predefined value. The zoom value is function of the application programming interface in spreadsheet software programs, such as Excel®, and scales the spreadsheet a certain percentage without changes to the formatting or the margins of the spreadsheet.

Word Processor Optimization

Figure 5:
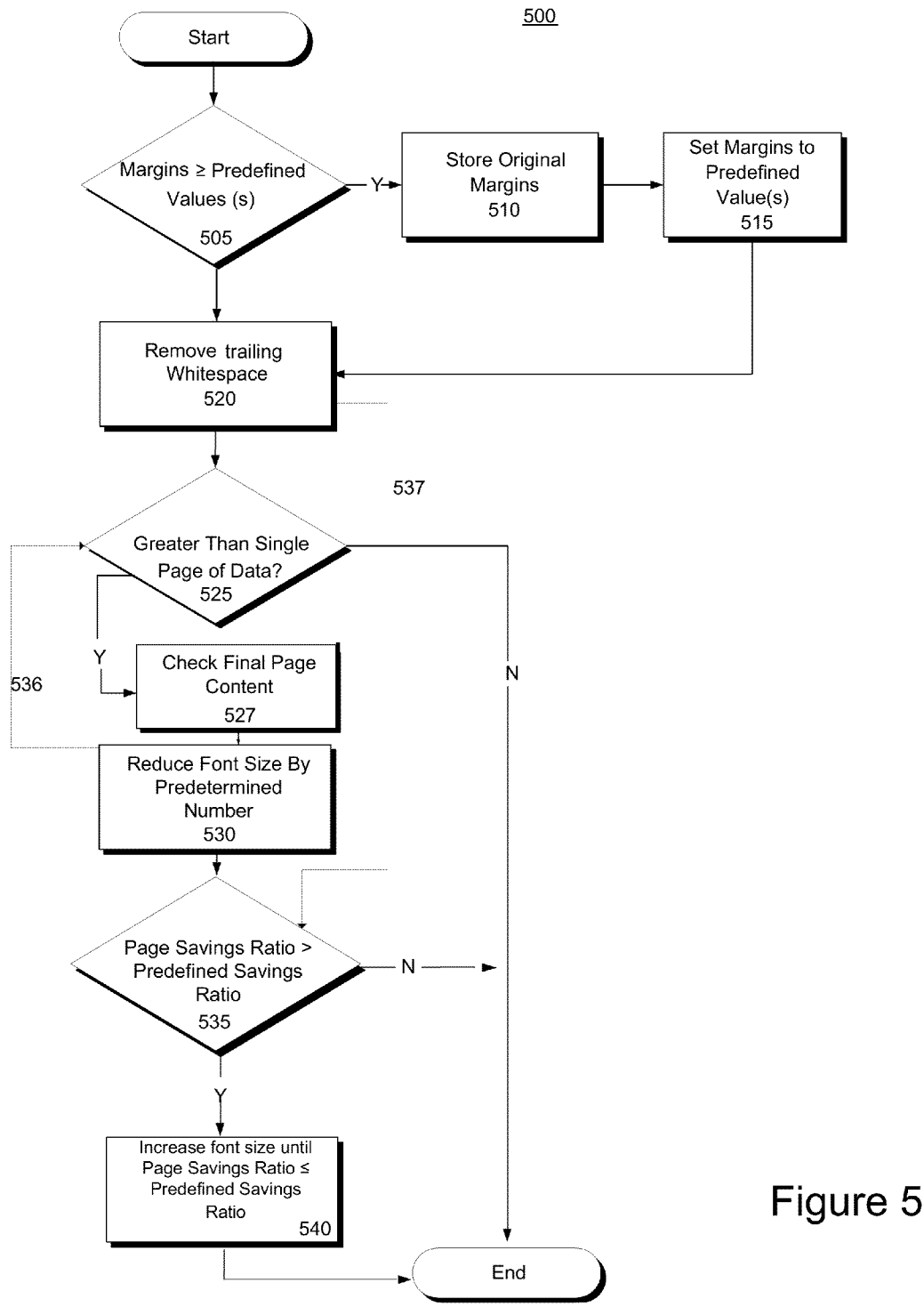
FIG. 5 illustrates another embodiment of a method for modifying a data layout to reduce the number of pages used when printing the data.

FIG. 5 illustrates another embodiment of a method 500 for modifying a data layout to reduce the number of pages used when printing the data. The embodiment shown by FIG. 5 illustrates modification of data having a document type; thus the print optimization module 222 modifies data using the method described in FIG. 5 when the print optimization module 222 is executed or invoked from a content-generation application for word processing, such as Word® document creation software, in one embodiment.

The print optimization module 222 determines 505 whether the margins specified by the original layout associated with the electronic document equal or exceed a predefined value. In one embodiment, the print optimization module 222 uses a predefined value in the determination 505. Alternatively, the print optimization module 222 determines 505 whether different margins specified by the original layout exceed or equal predefined values, allowing different predefined values to be used for determination 505 of different margins. Responsive to determining that a margin is less than a predefined value, the print optimization module 222 stores 510 the original margins specified by the original layout and modifies 515 the margin that is not less than the predefined value to equal the predefined value. In one embodiment, the determination 505 compares each margin to a single predefined value. For example, the print optimization module 222 determines 505 whether the margins associated with the original layout are greater than or equal to 0.25 inches. Alternatively, different margins may be compared to different predetermined values. In one embodiment, the print optimization module 222 determines 505 whether the original layout's top margin and its bottom margin equal or exceed a first predefined value and determines 505 whether the original layout's left margin and its right margin equal or exceed a second threshold value. For example, the print optimization module 222 determines 505 whether a top margin and a bottom margin equals or exceeds 0.25 inches and determines 505 whether a left margin and a right margin are less than 0.15 inches. Responsive to determining 505 that a margin is greater than or equal to a threshold value, the margin that is greater than or equal to the threshold value is stored 510 and modified 515 to equal the threshold value. As the margins affect the amount of paper that does not included printed data, reducing the margins based on the determination 505 increases the amount of paper including printed data.

In one embodiment, the print optimization module sets the threshold values on the basis of the type of document provided to the print optimization module 222. For instance, if the print optimization module 222 determines that the document is a book, the print optimization module 222 uses different threshold values for the left and right margins, resulting in different "interior" and "exterior" margins for the printed product.

In one embodiment, the content-generating application indicates to the print optimization plug-in 222, the minimum margins supported by the printer or printers configured for use by the content-generating application. In comparing the margins to the predefined value 505, the print optimization software ensures that the predefined values used for the minimum margins are greater than or equal to the minimum hardware margins to avoid cutting off any content during printing.

Responsive to determining 505 that a margin does not equal or exceed the predefined value, or predefined values, or after modifying 515 one or more margins to not exceed the predefined value or predefined values, the print optimization module 222 removes 520 trailing whitespace from the electronic document. For example, the print optimization module 222 identifies the end of text or images in the electronic document and removes 520 carriage returns, page breaks or other characters associated with whitespace from the end of the document. In another embodiment, the print optimization module 222 identifies carriage returns, page breaks or other characters associated with whitespace after the end of text or images on one or more pages of the electronic document and removes 520 the identified characters from the one or more pages. The removal of trailing whitespace 520 can result in immediate savings of one or more sheets of printing paper.

In one embodiment, after removing 520 trailing whitespace from one or more pages of the electronic document, the print optimization module 222 determines 525 whether the electronic document includes more than a single page of data. For example, the print optimization module 222 determines 525 whether the electronic document is one page or multiple pages. Responsive to determining 525 that the data includes multiple pages, the print optimization module 222 identifies the final page of the data and determines 527 whether the final page includes more than a threshold amount of content. For example, in one embodiment, the print optimization module 222 determines 527 whether the final page of an electronic document includes greater than two inches of text or other content when printed. In another embodiment, the printing optimization module 222 counts the number of characters that will be rendered on the final page.

For multiple-page documents, the print optimization software then reduces 530 the font size of the document by a fixed amount. In one embodiment, the font size is reduced by ½ of a point for the entire document. In another embodiment, the print optimization software changes the font size of only a subset of the document, such as the last few pages, in one embodiment. Whether or not the entire document is reduced depends on the number of pages in the document, in one embodiment, documents exceeding five pages will have only the last few pages' font size reduced. In another embodiment, the print optimization module determines how many sections are in the document, by analyzing the document's headings and subheadings as well as paragraph styles. After determining that the last few pages comprise a different subsection of the document, the font size of the last section is reduced. In one embodiment, the reduction in the font size 530 is repeated until the final low-value page is eliminated.

While the final page verification step 525 is shown in FIG. 5, in some embodiments, the print optimization module does not analyze the final page of the document. Instead, the print optimization module moves forward to the verification step 535 described below omitting the font size reduction steps by following a direct path 537.

In one embodiment, following the completion of step 530, the print optimization module returns 536 to step 525, given that a reduction of font size by a fixed amount may have resulted not only in the elimination of the original final page having low value, but has further resulted in another low value final page in the modified format. In one embodiment, the print optimization module 222 is limited to two iterations through the process, in another embodiment, the process is repeated so long as it results in a final page that has little content. In one embodiment, on any second pass through the final reduction step, a different approach must be used than in the original pass through the step. For example, while in the initial pass, the print optimization module 222 reduced the font size of the entire document, in the second pass, the print optimization module may only alter the font size of a subpart of the document.

After the possible elimination of the final page or the trailing pages 525, the print optimization module 222 then determines 535 if the page savings ratio is greater than a predefined savings ratio, as defined in Eq. 1 above. The page savings ratio is defined as the resulting pages savings count divided by the original page count. If it is, the print optimization module increases the font size until the page savings ratio is less than or equal to the predefined savings ratio.

In one embodiment, the print optimization module 222 seeks to make as few noticeable changes to the document as possible. By focusing on small changes to the margins and the font size the print optimization module 222 can save multiple pages while maintaining the overall appearance of the document. In another embodiment, the print optimization module 222, allows the user to select how aggressively the modifications will be. For example, in a highly aggressive mode, the software will change all settings, including font selections, to cut down the number of pages, even if the aggressive changes alter the overall appearance of the document.

In one embodiment, the print optimization module 222 stores in the storage device 220 the end users' history of accepted and rejected print modifications, so as to avoid certain changes (such as margin changes) that the user has routinely rejected in the past.

Web Page Optimization

Figure 6:
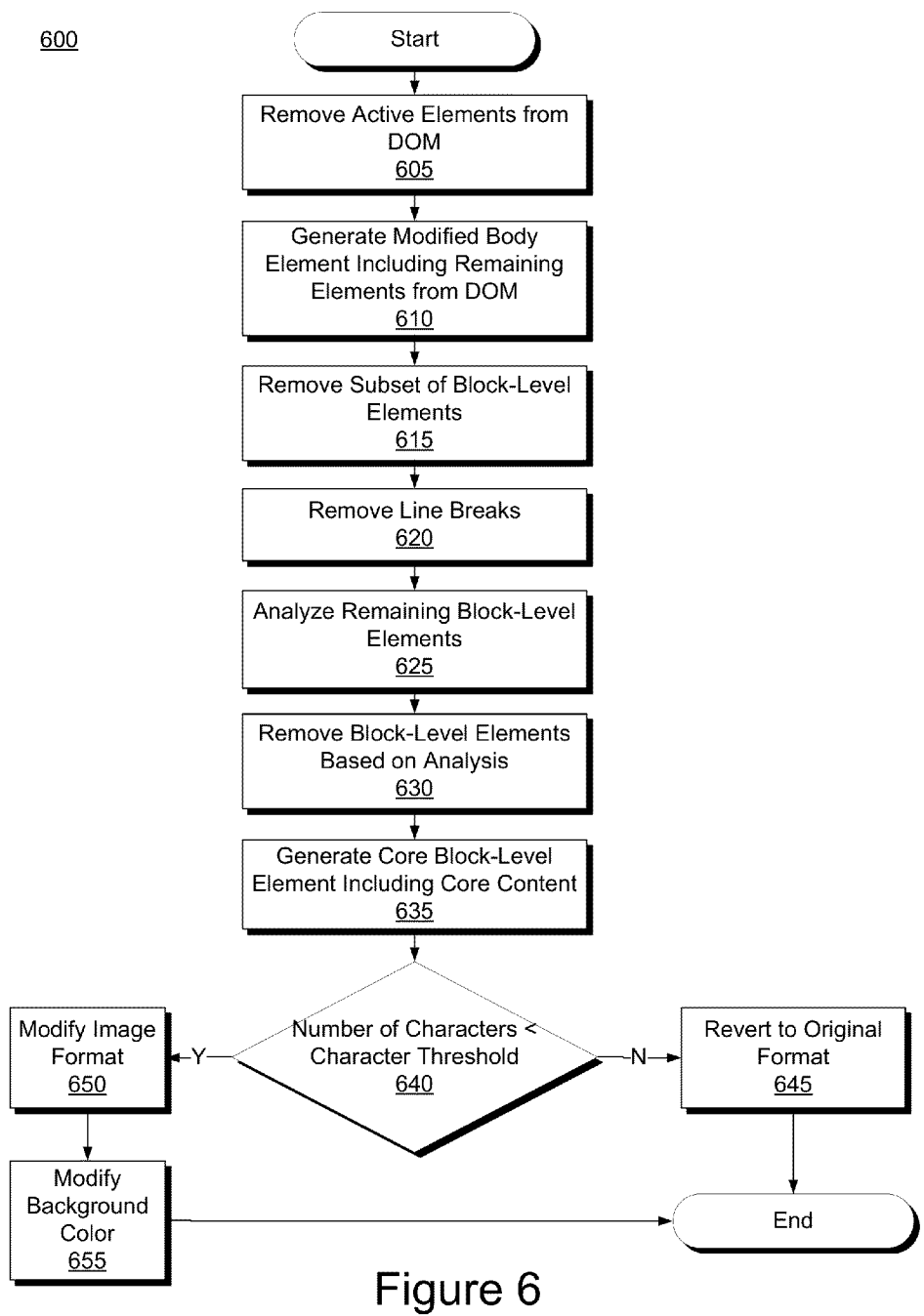
FIG. 6 illustrates an additional embodiment of a method for modifying a data layout to reduce the number of pages used when printing the data.

FIG. 6 illustrates an additional embodiment of a method 600 for modifying a data layout to reduce the number of pages used when printing the data. The embodiment shown by FIG. 6 illustrates modification of data having a Web page type; thus the print optimization module 222 modifies data using the method described in FIG. 6 when the print optimization module 222 is executed or invoked from a web-browser application, such as Internet Explorer® web browser, in one embodiment. In one embodiment, the print optimization module 222 detects that the content is a webpage given that the print optimization module 222 is a web browser plugin. In this embodiment, the print optimization module 222 receives the web content using the native format, such as HTML, XML, and other web text-based formats.

Initially, the print optimization module 222 identifies a document object model (DOM) associated with the data and removes 605 active elements from the DOM. The DOM identifies elements that comprise a Web page. For example, a DOM includes links, anchors, forms, comment regions, navigation bars or other elements comprising a Web page. The DOM may include active content such as client-side scripts (e.g., JAVASCRIPT or similar executable code), iframes, comment regions or other active content that is executed to provide functionality within a Web page. The print optimization module 222 initially removes 605 an active element, or a subset of active elements included in a Web page by identifying a tag, function call or other attribute associated with active content within the DOM and removing 605 data associated with the tag or other attribute. For example, the print optimization module 222 removes 605 comment regions, scripts, iframes or other active content from the DOM. In one embodiment, the print optimization module 222 removes 605 data associated with tags such as <script>, <object> or <iframe> or data associated with script events such as on Load, onClick, on MouseOver, on MouseEnter, on MouseDown, on MouseOut or similar active content commands.

After removing 605 the subset of the elements from the DOM, the print optimization module 222 generates 610 a modified body element within the DOM that includes the remaining elements. For example, the new body element includes elements other than navigation bars, comment regions and/or sidebars. In one embodiment, the modified body element includes markup language describing the content. For example, the modified body element includes hypertext markup language (HTML) or extensible markup language (XML) describing the content.

The modified body element includes one or more block-level elements describing the sub-components that comprise the modified body element. The print optimization module 222 removes 615 a subset of the block-level elements describing formatting or styling of data included in the modified body element. For example, the print optimization module 222 removes 615 style sheets, headers, footers, forms, comment regions or other data describing formatting of data included in the modified body element. For example, the print optimization module 222 removes 615 block-level elements associated with tags or identifiers associated with formatting and stored by the print optimization module 222, such as <h1>, <hr>, <comment>, <header> or <footer>. Further, the print optimization module 222 removes 620 line breaks from the modified block level element to reduce the amount of whitespace in the modified block level element.

After removing 615 the subset of block-level elements and removing 620 the whitespace, the print optimization module 222 analyzes 625 the remaining block-level elements. In one embodiment, the print optimization module 222 calculates a score associated with different block-level elements and removes 630 block-level elements having a score less than, or less than or equal to, a predetermined threshold. Alternatively, the print optimization module 222 removes 630 block-level elements having a score exceeding, or equaling or exceeding, a predetermined threshold. For example, the print optimization module 222 analyzes 625 a block level element by determining a density of links within the block-level element, a number of images within the block-level element, the amount of text within the block-level element and/or other attributes of the content of the block-level element.

In one embodiment, the print optimization module 222 increases a block-level element's score if the element includes one or more components identified by a positive component listing and decrements the block-level element's score if the element includes one or more components identified by a negative component listing. The positive component listing includes tags or other identifiers associated with components relevant to the data and the negative component listing includes tags or other identifiers associated with components not relevant to the data. For example, the negative component listing includes tags or other identifiers associated with comment regions, navigation bars, sidebars or other components identifying components other than data. Examples of tags included in the negative component listing include <comment>, <combx>, <disqus>, <tool>, <foot>, <menu>, <meta>, <rss>, <shoutbox>, <sidebar>, <sponsor>, , <promo>, <navbar>, <link>, <tags>, <widget> and/or <nav>. Examples of tags included in the positive component listing include <article>, <body>, <content>, <entry>, <hentry>, , <pagination>, <post> and/or <text>. The print optimization module 222 may then associate a score with the block-level element based on the attributes of its included content and use the score to determine whether to remove 222 the block-level element.

In one embodiment, the positive component listing and/or negative component listing are included in the print optimization module 222. Alternatively, the positive component listing and/or negative component listing are included in the storage device 220. In one embodiment, the positive component listing and/or negative component listing are updated via data received from a server 120 via the network 140.

In one embodiment, if a block-level element is comprised of lower-level block-level elements, the print optimization module 222 combines the scores associated with the lower-level block-level elements to analyze the block-level element. Hence, a parent block-level element is analyzed 625 by combining the results of an analysis 625 of its child block-level elements.

In addition to removing 630 a subset of the block-level elements based on the analysis 625, the print optimization module 222 also determines core content of the Web page from the analysis 625. For example, the print optimization module 222 identifies the block-level element, or block-level elements, having the highest score, or scores, as the core content of the Web page. The print optimization module 222 then generates 635 a core block-level element including the core content. In one embodiment, the core block-level element also includes a title that the print optimization module 222 extracts from a field of the DOM. For example, the print optimization module identifies a "<title>" tag and its associated data from the DOM and associates the data associated from the "<title>" tag with the core block-level element. In one embodiment, after generating 635 the core block-level element, the print optimization module 222 analyzes block-level elements comprising the core block-level element and removes a subset of the block-level elements, such as tables. For example, the print optimization module 222 associates a score with the constituent block-level elements of the core block-level element, as further described above, and removes constituent block-level elements having a score less than a core-component threshold value. In other embodiments, the score may be differently analyzed to determine whether to remove a constituent block-level element.

The print optimization module 222 then determines 640 if the number of characters in the core block-level element is less than a character threshold. In another embodiment, the print optimization module 222 then determines 640 if the number of characters in the core block-level element is less than or equal to a character threshold. For example, the print optimization module 222 determines 640 if the core-block level element includes less than 200 characters. If the core-block level element includes less than the threshold number of characters, the print optimization module 222 reverts 645 the Web page to its original layout, so the Web page is printed using its original format.

Responsive to determining 640 the core block-level element includes more than the threshold number of characters, or that the core-block level element includes at least the threshold number of characters, the print optimization module 222 modifies 650 images included in the core block-level element. For example, the print optimization module 222 modifies 650 images in the core block-level element so that the images appear in the correct position relative to the remaining content. After modifying 650 the images, if any, the print optimization module 222 modifies 655 the background color associated with the core block-level element. For example, the print optimization module 222 sets the background color to a specified color, such as white, to reduce the amount of ink used when printing.

E-Mail Optimization

Figure 7:
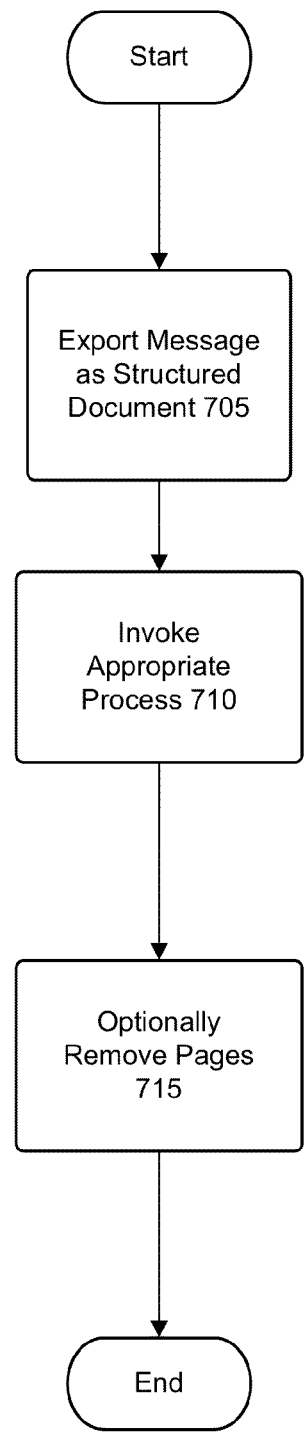
FIG. 7 illustrates an additional embodiment of a method for modifying a data layout to reduce the number of pages used when printing the data.

In addition to the example methods described above in conjunction with FIGS. 4-6, the print optimization module 222 may also implement different and/or additional methods for modifying layouts associated with different types of data. In one embodiment, the print optimization module 222 modifies a layout associated with data having a presentation type and/or data having an email type. E-mail Optimization process is shown in FIG. 7. For example, the print optimization module 222 modifies a layout associated with a slideshow or with an email prior to printing out the slideshow or email.

FIG. 7 illustrates an additional embodiment of a method 700 for modifying a data layout to reduce the number of pages used when printing the data. The embodiment shown by FIG. 7 illustrates modification of data having an e-mail type; thus the print optimization module 222 modifies data using the method described in FIG. 7 when the print optimization module 222 is executed from within an e-mail client application, such as Outlook® messaging software, in one embodiment.

Responsive to determining that data has an email type, the print optimization module 222 exports the message 705 into a structured document. E-mail messages arrive into a client program in any number of formats. The main body of the message may be encoded as plain text, structure data, such as HTML, or other formats, such as rich text format. In one embodiment, the export step 705 relies on the format identification information found in the message header field. In another embodiment, the export step 705 uses the client program's interface to export the message, allowing the program to handle the different formats natively. In one embodiment, the print optimization module 222 relies on the e-mail client API to generate HTML output of the e-mail message, regardless of the encoding used to send the message.

Given that the e-mail message is exported as a structured document 705, the printing optimization module 222 invokes 710 the same process 600 as was described for web pages. In one embodiment the process provides the user an option to remove low-value pages 715 from the printout. However, the invocation process 710, in one embodiment, includes additional steps beyond the process 600. For example, margins are lowered for e-mail messages to include a maximum amount of content on each page.

Figure 7B:
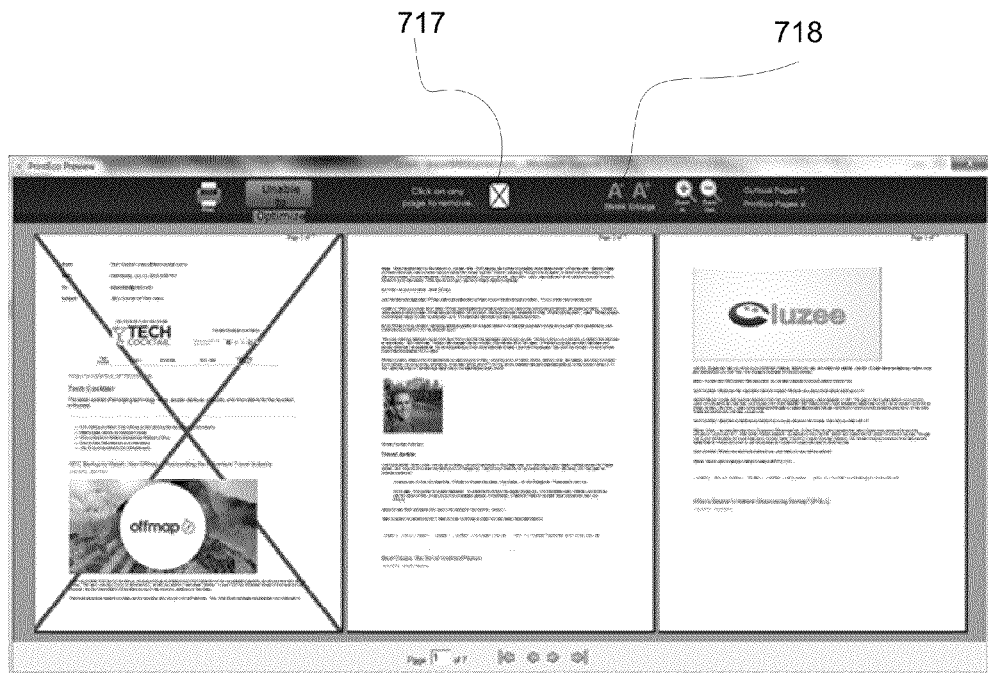
FIG. 7B illustrates one embodiment of an implementation of a method for reducing paper consumption during printing of e-mail messages.

As shown in FIG. 7B, in one embodiment, the software allows the user to select the pages to be removed and kept in a graphical interface simply by clicking the page to be excluded 717. In the screen shot shown in FIG. 7B, the first page has been excluded. The user may exclude pages by graphical means, rather than having to manually input page numbers.

In one embodiment, the optional removal step 715 appears only if the web page optimization process 600 was unable to identify a sufficient amount of content to remove automatically. This determination occurs in step 640. In another embodiment, the screen appears after every optimization. The screen allows the user to shrink and expand the content by activating the text size buttons 718. The preview screen also allows the user to revert to the original message if the optimizations are not acceptable to the user.

In one embodiment, the invocation process 710 further analyzes each attachment to the e-mail message. For example, the e-mail includes a word processor attachment, the process 500 is used, if a spreadsheet is identified, the spreadsheet process 400 is employed. In one embodiment, the user is queried before attachments are opened for analysis. In one embodiment, all attachments are processed in sequence using recursive calls to the printing optimization module 222.

In another embodiment, rather than invoking 710 the HTML export process 600 the exported structured document is analyzed to identify the most recent thread included in the email as well as other threads included in the email. For example, the print optimization module 222 identifies timestamp information included in the data and partitions the data according to timestamp information. In one embodiment, the print optimization module 222 identifies header information included in the data and partitions the data based on timestamps included in the header information. In one embodiment, the print optimization module 222 removes data having timestamp information outside of a specified date range, allowing a user to specify how much of a thread of emails is printed.

After identifying and/or removing threads from the data, the print optimization module 222 further analyzes the data to identify wasteful content. For example, the print optimization module 222 compares portions of the data to stored templates or information identifying wasteful content. In one embodiment, the print optimization module 222 includes templates describing formats of disclaimers, legal notices, copyright information or similar data. The print optimization module 222 may also identify images included in the data. In one embodiment, the print optimization module 222 identifies the detected wasteful content to a user and allows the user to select whether to remove portions, or all, or the detected wasteful content.

The print optimization module 222 displays the modified data to the user, allowing the user to accept the modified data or select the original data. In one embodiment, the print optimization module 222 then applies the method described above in conjunction with FIG. 5 to further reduce the number of pages printed.

Presentation Optimization

Figure 8:
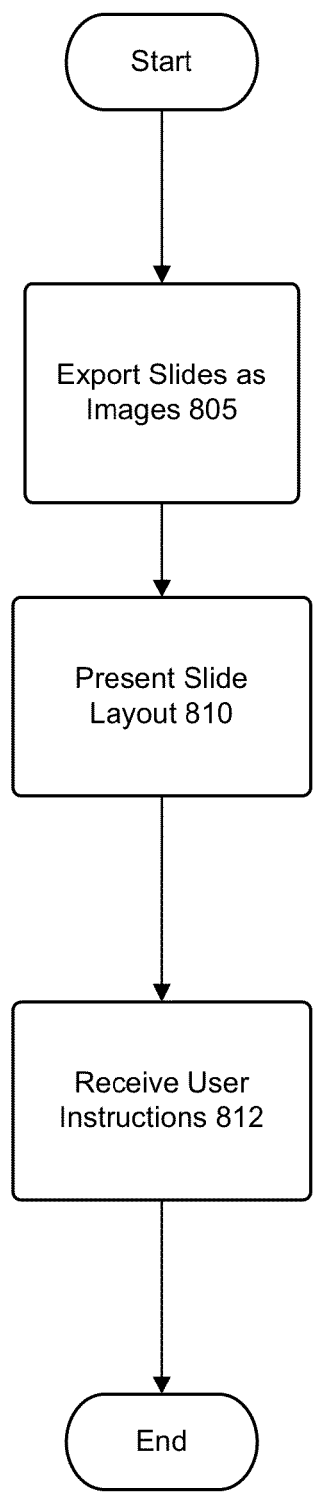
FIG. 8 illustrates an additional embodiment of a method for modifying a data layout to reduce the number of pages used when printing the data.

FIG. 8 illustrates an additional embodiment of a method 800 for modifying a data layout to reduce the number of pages used when printing the data. The embodiment shown by FIG. 8 illustrates modification of data having a presentation type; thus the print optimization module 222 modifies data using the method described in FIG. 8, when the print optimization module 222 is executed or invoked from a client application for creating presentations, such as PowerPoint® presentation graphics program, in one embodiment.

In one embodiment, data having a presentation type includes one or more slides representing portions of the data. Presentations are handled as a special case, given that presentations are often optimized for visual impact, rather than printed output.

Responsive to determining that data has a presentation type, the print optimization module 222 first generates 805 an image file corresponding to each slide. The image file contains multiple layers, such as a separate layer for backgrounds, and text. For example, the print optimization module 222 generates 5 different images for presentation-type data including 5 slides. The images are then stored in temporary storage. The print optimization module generates an alternate presentation print layout 810 and positions a plurality of the images on one or more pages comprising the updated layout. In one embodiment, the user may select the number of slides on a single page of the print preview layout. In another embodiment, the presentation module 222 generates an alternate presentation having slides including specific number of images per page, depending on the number of slides in the presentation. Depending on the source presentation file, two images, four images or eight images may be included in an alternate presentation layout generated at step 810.

Figure 8B:
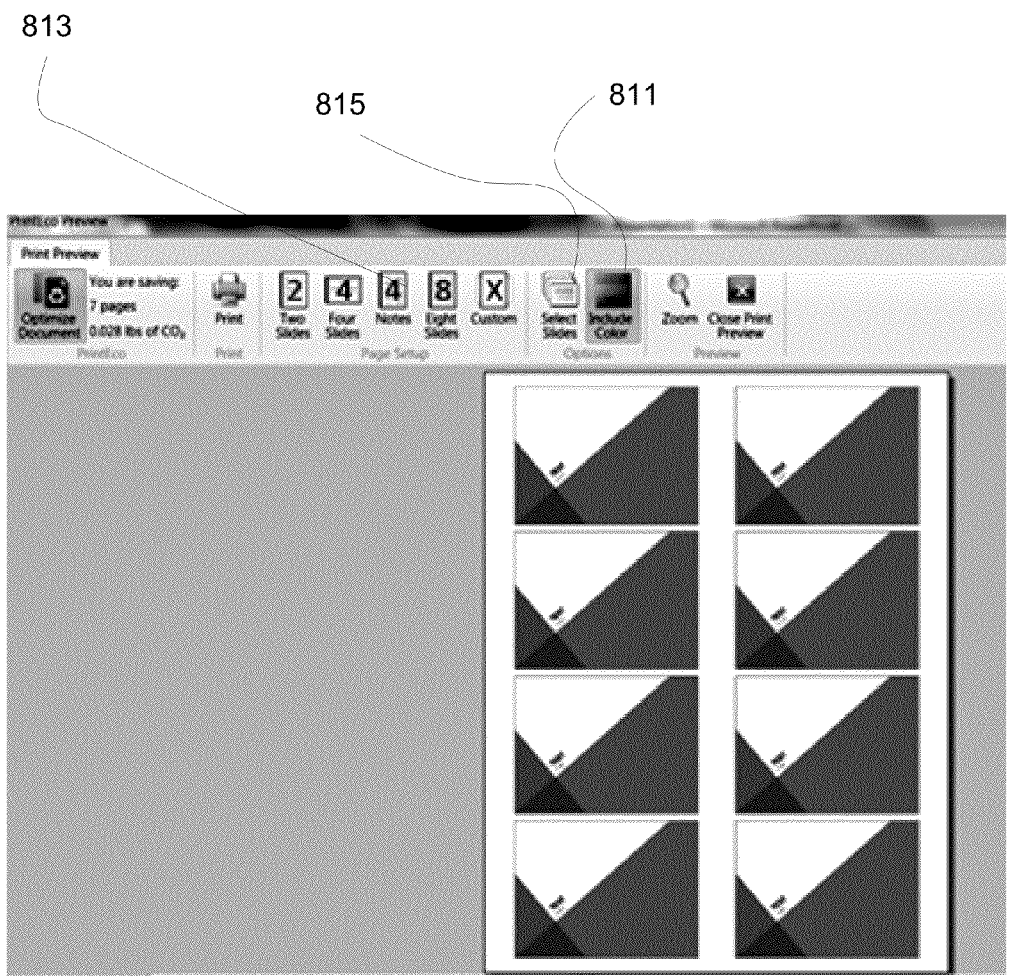
FIG. 8B illustrates one embodiment of an implementation of a method for reducing paper consumption during printing of presentations.

As shown in FIG. 8B, the alternative layout generated by step 810 is previewed during the step wherein the software 222 provides a means to receive user instructions 812. As part of step 812, the user may optionally select whether to include color 811, the number of slides per page 813, and manually include or exclude slides 815. In one embodiment, by default, the color option is turned off to save ink or toner. In one embodiment, the printing optimization module 222 automatically suggests that certain low-information slides be excluded, such as slides requesting meeting participant questions or slides containing only one clip art image. Additionally, the print optimization module 222 associates a grayscale setting with the alternate presentation to print the alternate presentation using gray scale rather than color, in one embodiment.

As shown in FIG. 8B, in one embodiment, the print optimization module 222 positions and sizes the plurality of images on the alternate presentation to minimize the amount of whitespace included on the slides. In the example shown in FIG. 8B, 8 slides are shown with a minimum amount of white space around the slides. The placement and re-sizing of the slides maintains the proportions of the slides, while removing unnecessary whitespace. In one embodiment, if the original presentation has a layout where two slides are printed on a sheet of paper, the alternate presentation is formatted so that a slide of the alternate presentation includes images of multiple slides from the original presentation, allowing the alternate presentation to be printed so that more than two slides of the original presentation are included on a sheet of paper. This more efficient placement of images on the alternate presentation 810 reduces the number of slides needed to include the data from the presentation, which reduces the number of pages needed to generate a physical representation of the presentation.

In one embodiment, the modified layout 810 significantly improves over the standard presentation printing options. For instance in Microsoft PowerPoint default printing option, only three slides per page with notes can fit, in one embodiment of the invention, four slides per page with notes can fit (or as shown in FIG. 8B eight slides without notes). Furthermore, in one embodiment, the user may select a custom number of slides per page while selecting the number of slides per page in option 813.

Accordingly, the print optimization module 222 allows the modified layout associated with different types of electronic data to reduce the amount of paper used to generate a physical representation of the electronic data. This reduction in paper reduces paper costs as well as reduces the amount of power used to generate a physical representation of the electronic data. Reducing the amount of paper used and the amount of power consumed by printing allows the print optimization module 222 to conserve resources and reduce the amount of greenhouse gases produced when generating a physical representation of the electronic data.

In various embodiments, the methods 300, 400, 500, 600, 700, 800 described above in conjunction with FIGS. 3-8B and other methods described above are implemented by instructions for performing the described actions embodied within a computer readable storage medium that are executable by a processor. For example, the storage device 220 includes in instructions for performing the actions that are executed by the processor 210. Those of skill in the art will recognize that the above-described methods may be implemented in embodiments of hardware, software, firmware or combinations thereof. Moreover, other embodiments of the described methods above may include different and/or additional steps than the ones described herein.

Additional Considerations

Some portions of the above description describe embodiments in terms of algorithmic and/or symbolic representations of operations on information. For example, FIGS. 3-6 use algorithmic and/or symbolic descriptions of operations on information. These algorithmic and/or symbolic descriptions, as well as other similar descriptions in the prior disclosure, are commonly used by those skilled in the data processing arts to convey the substance of their work effectively to others skilled in the art. These operations, while described functionally, computationally or logically, are understood to be implemented by computer executable code that is executed by a processor or equivalent electrical circuits, microcode or the like. Furthermore, in the above description these arrangements of operations are, out of convenience, referred to as "modules," without loss of generality. The described operations and their associated modules may be embodied in software, firmware, hardware or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for modifying a layout associated with electronic data to more efficiently use resources when generating a paper representation of the electronic data through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention.

The invention claimed is:

1. A system for generating optimized content to decrease the number of physical pages needed to represent an original content, the method comprising:
   receiving an indication from a user that a modification of the original content is needed to decrease the number of pages from within a content-generating application;
   identifying the type of original content based on which content-generating application was the source of the indication;
   providing the original content comprising spreadsheet data from the content-generating application to a print optimization module;
   optimizing using the print optimization module by
      determining whether margins in the original layout have exceeded a predefined value; and if so storing the original margin value and using a new modified margin value in the modified layout;
      determining whether font size in the original layout has exceeded a predefined font size; and if so setting a maximum page count to a first value and subsequently decreasing the font size in the original layout to a second value creating a second maximum page count;
      determining the number of pages in the printout if the spreadsheet is presented in landscape mode;
      determining the number of pages in the printout if the spreadsheet is presented in portrait mode;
      generating a modified layout using a modified margin and font size and orientation resulting in fewest printout pages;
   calculating a page savings ratio by comparing the number of pages in the original content and the modified content;
   restoring the original layout if the page savings ratio exceeds a threshold savings ratio;
   presenting the modified content for acceptance by a user;
   generating a physical copy of the modified content.

2. The system generating optimized content of claim 1 wherein the threshold savings ratio comprises 50 percent.

3. The system generating optimized content of claim 1 wherein the system comprises a plug-in running within the content-generating application.

4. The system generating optimized content of claim 3 wherein the provision step comprises additional instructions executed when a user clicks on the content-generating application print function.

5. The system generating optimized content of claim 1 wherein the presentation step comprises showing the optimized content using the content-generating application's own print preview function.

6. A system for generating optimized content to decrease the number of physical pages needed to represent an original content, the method comprising:
   receiving an indication from a user that a modification of the original content is needed to decrease the number of pages from within a content-generating application;
   identifying the type of original content based on which content-generating application was the source of the indication;
   providing the original content comprising word processor data from the content-generating application to a print optimization module;
   optimizing using the print optimization module by
   determining whether margins in the original layout have exceeded a predefined value; and if so storing the original margin value and using a new modified margin value in the modified layout;

removing trailing whitespace;

generating a modified layout based on updated margins and font size;

calculating a page savings ratio by comparing the number of pages in the original content and the modified content;

if the page savings ratio exceeds a threshold value, increasing the font size of the modified content by a font size step value; recalculating the page savings ratio until the page savings ratio is less than or equal to the threshold value;

restoring the original layout if the page savings ratio exceeds a threshold savings ratio;

presenting the modified content for acceptance by a user;

generating a physical copy of the modified content.

7. The system generating optimized content of claim 6 wherein the font size step value comprises ½ of a point.

8. The system generating optimized content of claim 6 wherein the threshold value comprises 50 percent.

9. A system for generating optimized content to decrease the number of physical pages needed to represent an original content, the method comprising:

receiving an indication from a user that a modification of the original content is needed to decrease the number of pages from within a content-generating application;

identifying the type of original content based on which content-generating application was the source of the indication;

providing the original content comprising e-mail data from the content-generating application to a print optimization module;

optimizing using the print optimization module by exporting the e-mail message elements as a web page document;

removing active elements from the web page document;

generating a modified body limited to non-active elements;

removing non-content-bearing elements from the non-active elements;

removing line breaks form the modified body;

analyzing remaining block level elements;

assigning a point value to each remaining block level element by increasing by a predetermined value the point value of each block level element associated with a first subset of identifiers;

decreasing by a predetermined value the point value of each block level element associated with a second subset of identifiers;

removing block level elements having a value below predefined threshold;

removing block-level elements having a value below a threshold amount;

generating a modified layout based on remaining block-level elements;

requesting input from the user to identify additional pages to be removed;

generating a modified layout based on the web page optimization and user input;

calculating a page savings ratio by comparing the number of pages in the original content and the modified content;

restoring the original layout if the page savings ratio exceeds a threshold savings ratio;

presenting the modified content for acceptance by a user;

generating a physical copy of the modified content.

10. The system generating optimized content of claim 9 wherein the e-mail message contains attachments and each attachment is processed by the system separately and recursively to generate a modified layout for each attachment.

11. A system for generating optimized content to decrease the number of physical pages needed to represent an original content, the method comprising:

receiving an indication from a user that a modification of the original content is needed to decrease the number of pages from within a content-generating application;

identifying the type of original content based on which content-generating application was the source of the indication;

providing the original content comprising word processor data from the content-generating application to a print optimization module;

optimizing using the print optimization module by determining whether margins in the original layout have exceeded a predefined value; and if so storing the original margin value and using a new modified margin value in the modified layout;

removing trailing whitespace;

combining the pages in a multi-page document to eliminate a final page where the final page in a multi-page document contains an amount of information that is below a threshold value;

generating a modified layout based on updated margins and font size;

calculating a page savings ratio by comparing the number of pages in the original content and the modified content;

if the page savings ratio exceeds a threshold value, increasing the font size of the modified content by a font size step value; recalculating the page savings ratio until the page savings ratio is less than or equal to the threshold value;

presenting the modified content for acceptance by a user;

generating a physical copy of the modified content.

12. The system generating optimized content of claim 11 wherein the font size step value comprises ½ of a point.

13. The system generating optimized content of claim 11 wherein the threshold value comprises 50 percent.

14. The system generating optimized content of claim 11 wherein the page combination step comprises decreasing font size of the original layout by ½ of a point until at least the final page is combined with the remaining pages in the document.

15. The system generating optimized content of claim 11 wherein the page combination step comprises decreasing font size of the original layout by ½ of a point until the modified content font size reaches a threshold value.

* * * * *